T. WINSLOW.
Plow.
No. 47,486.  Patented Apr. 25, 1865.
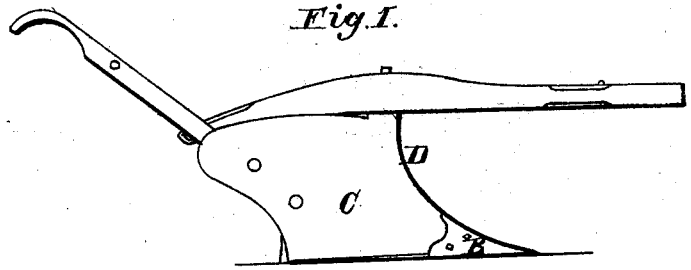
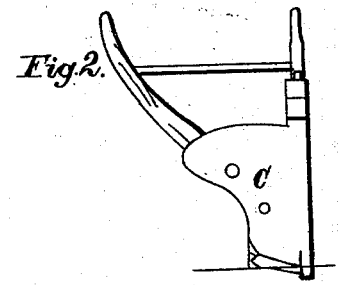
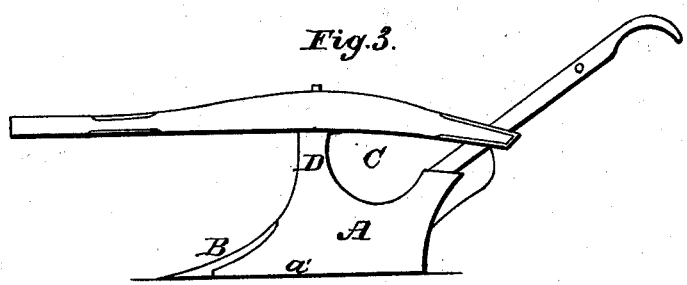
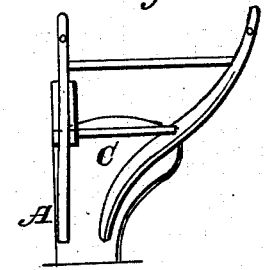
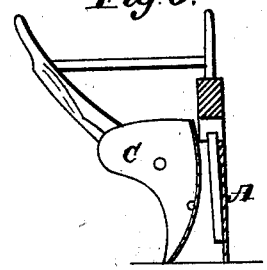
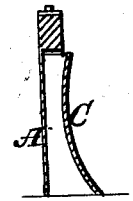
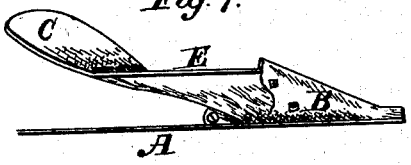
Witnesses:
Inventor.

UNITED STATES PATENT OFFICE.

T. WINSLOW, OF CLEVELAND, OHIO.

IMPROVEMENT IN PLOWS.

Specification forming part of Letters Patent No. 47,486, dated April 25, 1865.

*To all whom it may concern:*

Be it known that I, T. WINSLOW, of Cleveland, in the county of Cuyahoga and State of Ohio, have invented new and useful Improvements in Plows; and I do hereby declare that the following is a full and complete description of the construction and operation of the same, reference being had to the accompanying drawings, making part of this specification, in which—

Figure 1 is a view of the mold-board side of the plow. Fig. 2 is a front view. Fig. 3 is a view of the landside. Fig. 4 is a rear view; and Figs. 5 and 6 are transverse sections. Fig. 7 is an outline view of the under side.

Like letters refer to like parts.

My invention relates to such a construction of the plow that without changing the relative position of any of its parts a deep or shallow furrow may be plowed at pleasure. The means by which this is accomplished consists in, first, the depth of the plow from the beam to the lower edge of the landside; and, second, in the relative position of the lower margin of the mold-board with that of the landside.

A represents the landside. This does not differ in any essential feature from those in common use except in its depth from $a$ to $a'$, which is at least one-third greater than in the common plow.

The share B is of the usual form, and attached to the mold-board by bolts in the ordinary way.

The mold-board C and the landside B are firmly united in front, as seen at D, and at the point of union are made thin and sharp in order to easily penetrate the soil. The lower margin of the mold-board E, Fig. 7, forms a line nearly or quite parallel with the landside A, by means of which a very deep furrow may be cut with comparatively light draft, while a shallow furrow may be cut with equal facility.

Some of the advantages this plow has over others may be stated as follows: It requires less draft than other plows. A deep or shallow furrow can be plowed at pleasure. It answers every purpose of a subsoil-plow, combining in one implement both the common plow and subsoil. The draft is believed to be lighter than any other plow in use capable of performing the same amount of work.

What I claim as my improvement, and desire to secure by Letters Patent, is—

The herein-described construction of plows, the distinguishing feature being the relative positions of the lower edge of the mold-board to the landside, substantially as herein set forth, thus forming in one implement a common and subsoil plow.

T. WINSLOW.

Witnesses:
W. H. BURRIDGE,
A. W. MCCLELLAND.